(12) United States Patent
Chen

(10) Patent No.: US 6,966,335 B2
(45) Date of Patent: Nov. 22, 2005

(54) VALVE CORE FOR SINGLE HANDLED FAUCET

(75) Inventor: Mei-Li Chen, Taichung Hsien (TW)

(73) Assignee: Kuching International Ltd., Taichung Hsien (TW)

( * ) Notice: Subject to any disclaimer, the term of this patent is extended or adjusted under 35 U.S.C. 154(b) by 259 days.

(21) Appl. No.: 10/610,765

(22) Filed: Jul. 2, 2003

(65) Prior Publication Data

US 2005/0000576 A1    Jan. 6, 2005

(51) Int. Cl.⁷ .......................................... F16K 11/076
(52) U.S. Cl. ........................ 137/625.17; 137/625.4; 137/636.3
(58) Field of Search ................. 137/625.17, 625.14, 137/636.3

(56) References Cited

U.S. PATENT DOCUMENTS

| | | | | |
|---|---|---|---|---|
| 3,324,884 A | * | 6/1967 | Dornaus | 137/625.17 |
| 3,433,264 A | * | 3/1969 | Parkison | 137/625.17 |
| 3,533,436 A | * | 10/1970 | Parkison | 137/625.4 |
| 3,965,936 A | * | 6/1976 | Lyon | 137/625.17 |
| 4,362,186 A | * | 12/1982 | Parkison et al. | 137/625.17 |
| 4,738,281 A | * | 4/1988 | Limet et al. | 137/625.17 |
| 4,986,306 A | * | 1/1991 | Ferrari | 137/625.17 |
| 6,202,693 B1 | * | 3/2001 | Bollo | 137/625.17 |
| 6,321,789 B1 | * | 11/2001 | Chen | 137/625.17 |

* cited by examiner

Primary Examiner—John Rivell
(74) Attorney, Agent, or Firm—Egbert Law Offices

(57) ABSTRACT

A valve core for a single handled faucet is made up of a valve housing, a valve stick, a base mount, a switching control valve, and a valve seat wherein the base mount, engaged with the valve stick and mounted onto the switching control valve thereof, is securely located at the valve housing therein, stably refrained from being moved or rotated by the valve stick thereof in operation. The valve stick is pivotally moved at the base mount therein to activate the switching control valve via a protruding connecting section thereof, driving an upper switch valve of the valve seat joined to the bottom of the switching control valve thereof to open the valve core for water discharge. Via a protruded guide spot of the base mount as a pivoting point, the valve stick is also rotated left or right with a turning protruded block thereof moved at a turning cut area of the base mount therein to adjust the water temperature. Meanwhile, the valve stick along with a two-staged valve stick seat is prevented from being directly contacted with the valve housing in operation, facilitating the easy operation of the valve stick thereof even under low torque. Besides, the protruded guide spot is limited to move at an indented recess of the switching control valve therein, ensuring the precise movement of the switching control valve when activated by the protruded connecting section of the valve stick to open the valve core for water discharge.

1 Claim, 5 Drawing Sheets

VALVE CORE FOR SINGLE HANDLED FAUCET

BACKGROUND OF THE INVENTION

The present invention is related to a valve core for a single handled faucet, comprising a valve housing, a valve stick, a base mount, a switching control valve, and a valve seat wherein the base mount, engaged with the valve stick and mounted onto the switching control valve thereof, is securely located at the valve housing therein, stably refrained from being moved or rotated by the valve stick thereof in operation. The valve stick, pivotally moved at the base mount therein, will activate the switching control valve via a protruded connecting section, driving an upper switch valve of the valve seat joined at the bottom thereof for water discharge. The valve stick is also rotated left or right with a turning protruded block thereof moved at a turning cut area of the base mount therein to adjust the water temperature. Meanwhile, the valve stick thereof is prevented from being directly contacted with the valve housing, facilitating the easy operation of the valve stick thereof even under low torque. Besides, a protruded guide spot of the base mount is limited to move at an indented recess of the switching control valve therein, ensuring the precise movement of the switching control valve in operation.

Please refer to FIG. 1. A conventional valve core 10 for a single handled faucet is mainly made up of a valve housing 11, a regulating seat 12, a switch control seat 13, and a valve seat 14. The valve housing 11, a step-wise sheltering case, has a valve chamber 111 disposed at the interior thereof, a pair of opposite stop blocks 112 disposed at the inner top surface of the valve chamber 111 thereof, a locating block 113 disposed at the middle of the opposite stop blocks 112 thereof, and a plurality of insert grooves 114 cut at the lower periphery thereof. The regulating seat 12 is equipped with an arc locating block 121 extending outwards at the lower periphery thereof, a switch control stick 122 pivotally joined at the center thereof, and a rounded and flat-end connecting block 123 protruding at the bottom of the switch control stick 122 thereof to be engaged with a connecting groove 131 of the switch control seat 13 thereof. The switch control seat 13 also includes a locating recess 132 cut at one side thereof. The valve seat 14 is made up of an upper switching control valve 141, and a lower switching control valve 142 with a plurality of insert parts 143 extending upwards at the lower periphery thereof.

Please refer to FIG. 2. In assembly, the rounded and flat-end connecting block 123 of the switch control stick 122 is engaged with the connecting groove 131 of the switch control seat 13 thereof to fix the regulating seat 12 onto the switch control seat 13 thereof. The switch control seat 13 is then mounted on top of the upper switching control valve 141 and the valve housing 11 applied from top to bottom to adapt the regulating seat 12 and the switch control seat 13 therein respectively with the arc locating block 121 thereof located at the opposite stop blocks 112 there-between and the locating recess 132 thereof engaged with the locating block 113 thereof. Finally, the insert parts 143 of the valve seat 14 are fixedly joined to the insert grooves 114 of the valve housing 11 to complete the assembly thereof.

There are some drawbacks to such conventional valve core 10 for a single handled faucet. First, the switch control stick 122 of the valve core 10 is rotated left or right to regulate the water temperature, activating the regulating seat 12 therewith to directly contact with the valve housing 11 in large frictional area, which can increase the frictional coefficient thereof and make the switch control stick 122 hard to be rotated in operation. Second, the switch control stick 122 is switched to drive the locating recess 132 of the switch control seat 13 engaging with the locating block 113 of the valve housing 11 so as to open the valve core 10 for water discharge. In case the locating recess 132 thereof is imprecisely engaged with the locating block 113 thereof, the valve core 10 can't be properly operated for the discharge of water. Third, the opposite stop blocks 112 and the locating block 13 thereof are matched to the arc locating block 121 and the locating recess 132 thereof, which, uneconomically complicated in structure, may boost the costs of materials and production thereof.

SUMMARY OF THE PRESENT INVENTION

It is, therefore, the primary purpose of the present invention to provide a valve core for a singled handled faucet, comprising a valve housing, a valve stick, a base mount, a switching control valve, and a valve seat wherein the base mount, engaged with the valve stick and mounted onto the switching control valve thereof, is securely located at the valve housing therein, stably refraining from being moved or rotated by the valve stick thereof in operation. The valve stick, pivotally moved at the base mount therein, will activate the switching control valve via a protruded connecting section, driving an upper switch valve of the valve seat joined at the bottom thereof so as to open the valve core for water discharge. With a protruded guide spot of the base mount as a pivoting point, the valve stick is also rotated left or right with a turning protruded block thereof moved at a turning cut area of the base mount therein to adjust the water temperature. Meanwhile, the valve stick along with a two-staged valve stick seat is prevented from being directly contacted with the valve housing, facilitating the easy operation of the valve stick thereof with less force.

It is, therefore, the secondary purpose of the present invention to provide a valve core for a single handled faucet wherein the protruded guide spot of the base mount is limited to move at an indented recess of the switching control valve therein, ensuring the precise movement of the switching control valve thereof when activated by the valve stick to open the valve core for water discharge.

It is, therefore, the third purpose of the present invention to provide a valve core for a single handled faucet wherein the valve housing is provided with a retaining block disposed at the inner top surface thereof to be engaged with a retaining cavity of the base mount for secure location thereof, greatly simplified in structure and reduced in the costs of materials and production thereof.

DETAILED DESCRIPTION OF THE PREFERRED EMBODIMENTS

Figure 1:
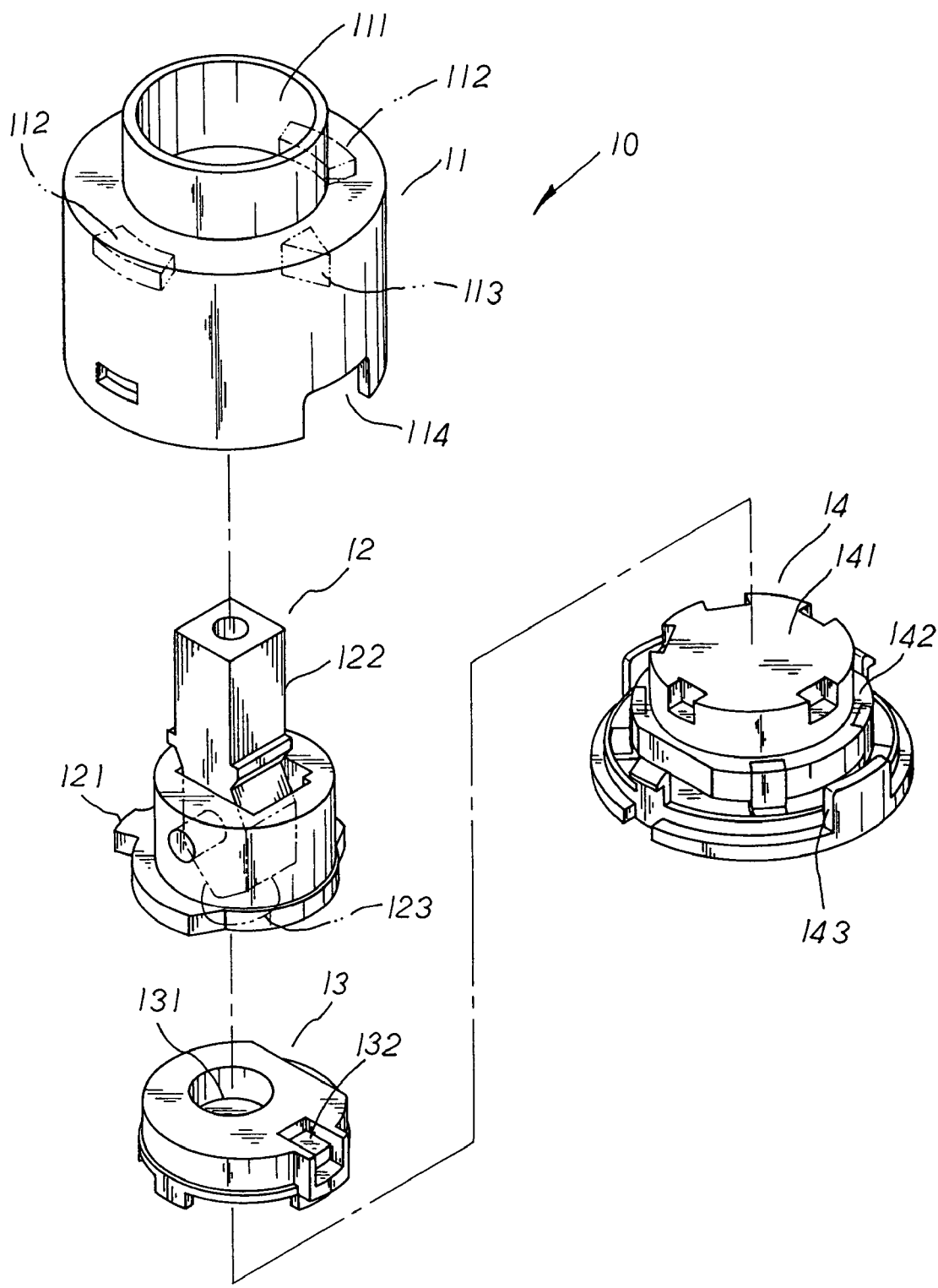
FIG. 1 is a perspective exploded view of a conventional valve core for a single handled faucet.
Figure 2:
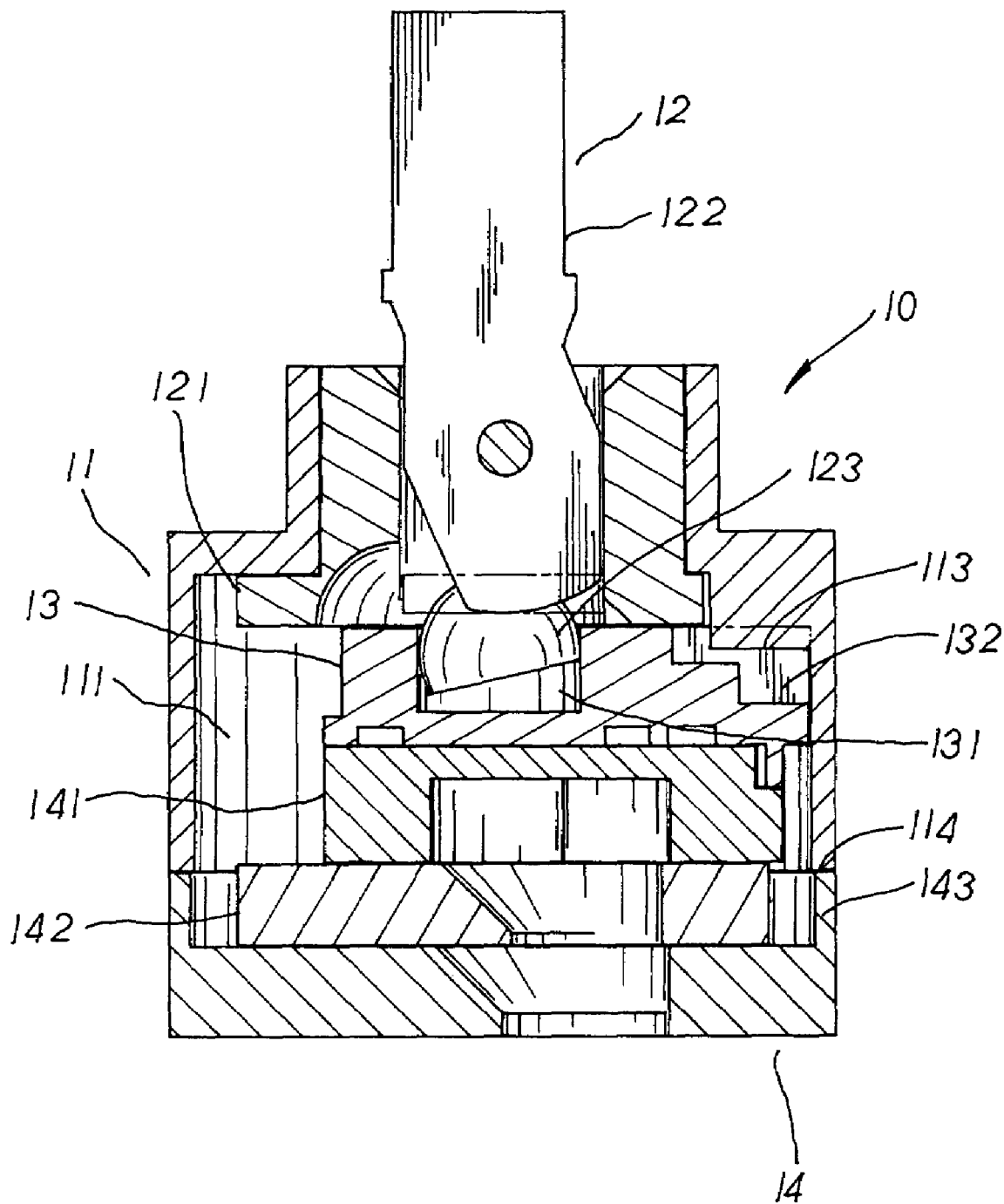
FIG. 2 is a cross sectional view of the conventional valve core for a single handled faucet in assembly.
Figure 3:
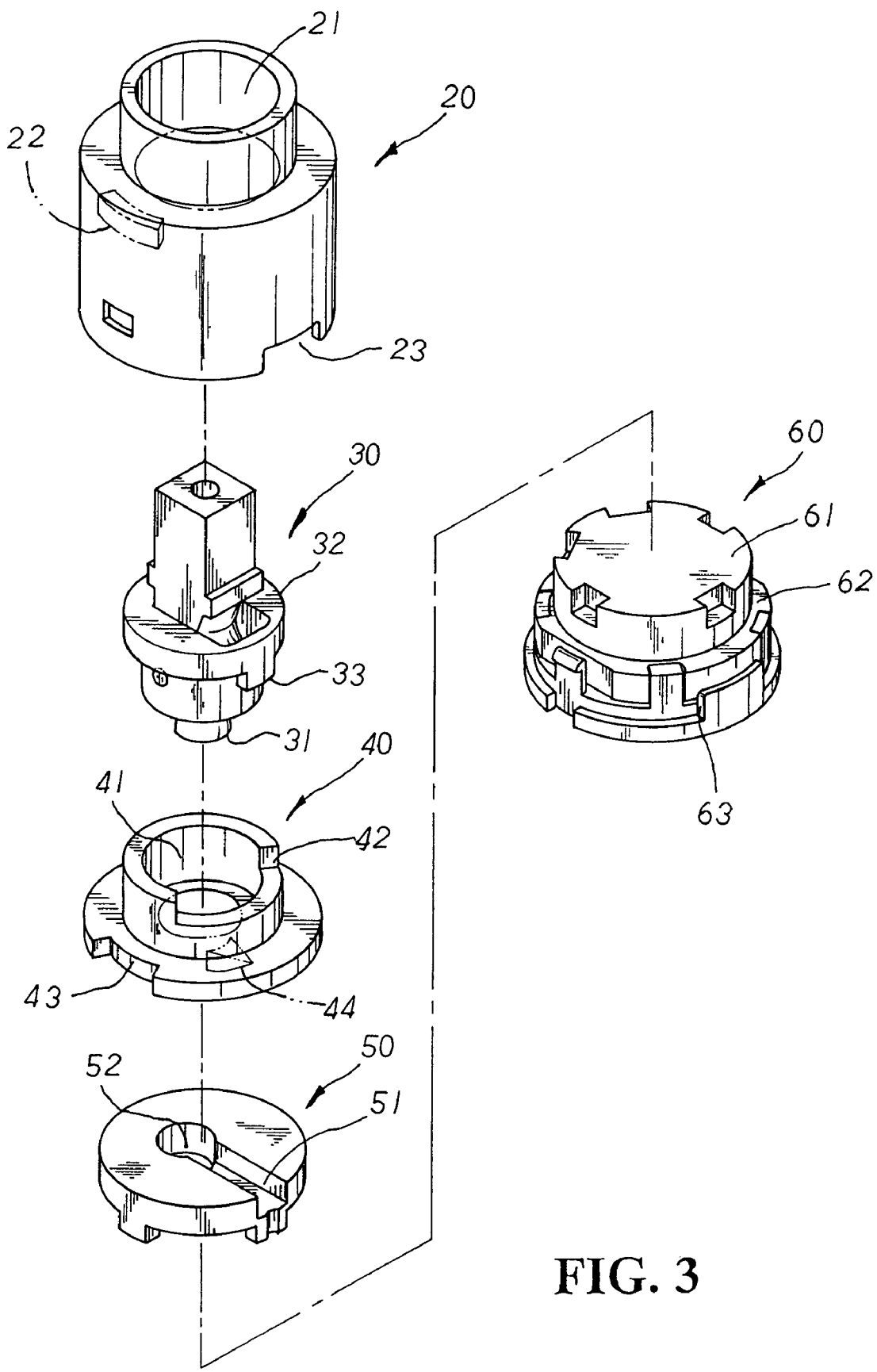
FIG. 3 is a perspective exploded view of the present invention.

Please refer to FIG. 3. The present invention is related to a valve core for a single handled faucet, comprising a valve housing 20, a valve stick 30, a base mount 40, a switching control valve 50, and a valve seat 60. The valve housing 20, a two-staged sheltering case, has a valve chamber 21 disposed at the interior thereof, a retaining block 22 protruding at the inner top surface of the valve chamber 21 thereof, and a plurality of insert grooves 23 cut at the lower periphery thereof. The valve stick 30 is provided with a protruded connecting section 31 extending downwards at the bottom thereof, and a two-staged valve stick seat 32 with a turning protruded block 33 extending downwards at one side of the upper stage thereof joined at the middle section thereof. The base mount 40, a two-staged means, is equipped with a pivot hole 41 disposed at the center thereof, a turning cut area 42 defined at one side of the upper section thereof, a retaining cavity 43 cut at one side of the lower section thereof, and a protruded guide spot 44 disposed at the lower surface of the bottom side thereof. The switching control valve 50 has an indented recess 51 cut at one side thereof, and a receiving hole 52 communicating with the indented recess 51 thereof. The valve seat 60 is made up of an upper switch valve 61, and a lower switch valve 62 with a plurality of insert parts 63 extending upwards at the lower periphery thereof.

Figure 4:
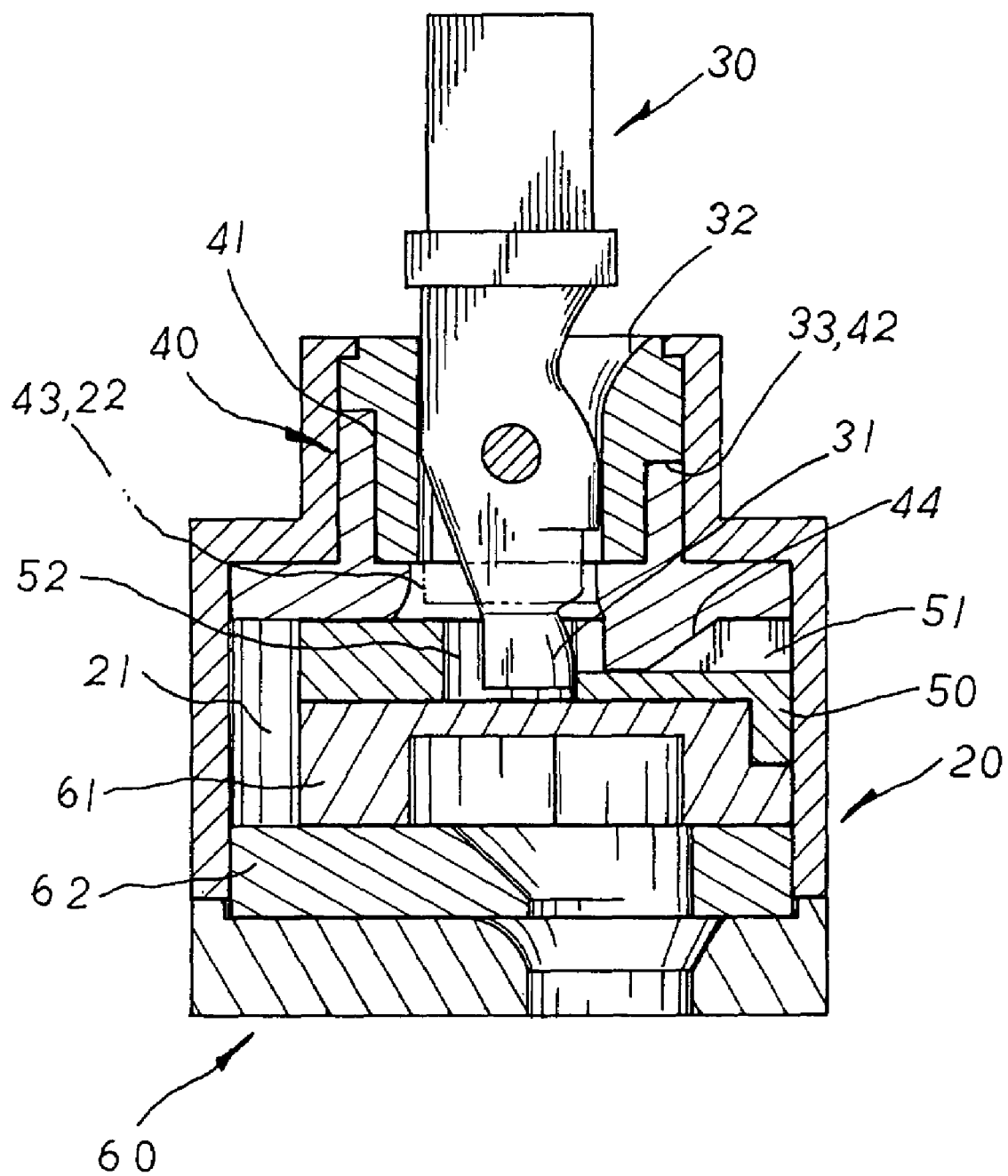
FIG. 4 is a cross sectional view of the present invention in assembly.

Please refer to FIG. 4. In assembly, the two-staged valve stick seat 32 of the valve stick 30 is pivotally joined to the pivot hole 41 of the base mount 40 with the turning protruded block 33 thereof retained at the turning cut area 42 therein, and the protruded connecting section 31 extending downwards at the bottom of the base mount 40 thereof. The switching control valve 50 mounted to the valve seat 60 at the bottom thereof is joined to the engaged valve stick 30 and the base mount 40 thereof with the protruded guide spot 44 of the base mount 40 received at the indented recess 51 thereof and the protruded connecting section 31 of the valve stick 30 adapted at the receiving hole 52 therein. The valve housing 20 is applied from top to bottom to adapt the valve stick 30, the base mount 40, and the switching control valve 50 respectively at the valve chamber 21 therein with the retaining block 22 thereof engaged with the retaining cavity 43 of the base mount 40 for secure location thereof Thus, the base mount 40, fixedly located at the valve housing 20 therein, is refrained from being moved or rotated by the valve stick 30 thereof. Finally, the insert parts 63 of the valve seat 60 are fixedly joined to the insert grooves 23 of the valve housing 20 thereof to complete the assembly of the present invention.

Figure 5:
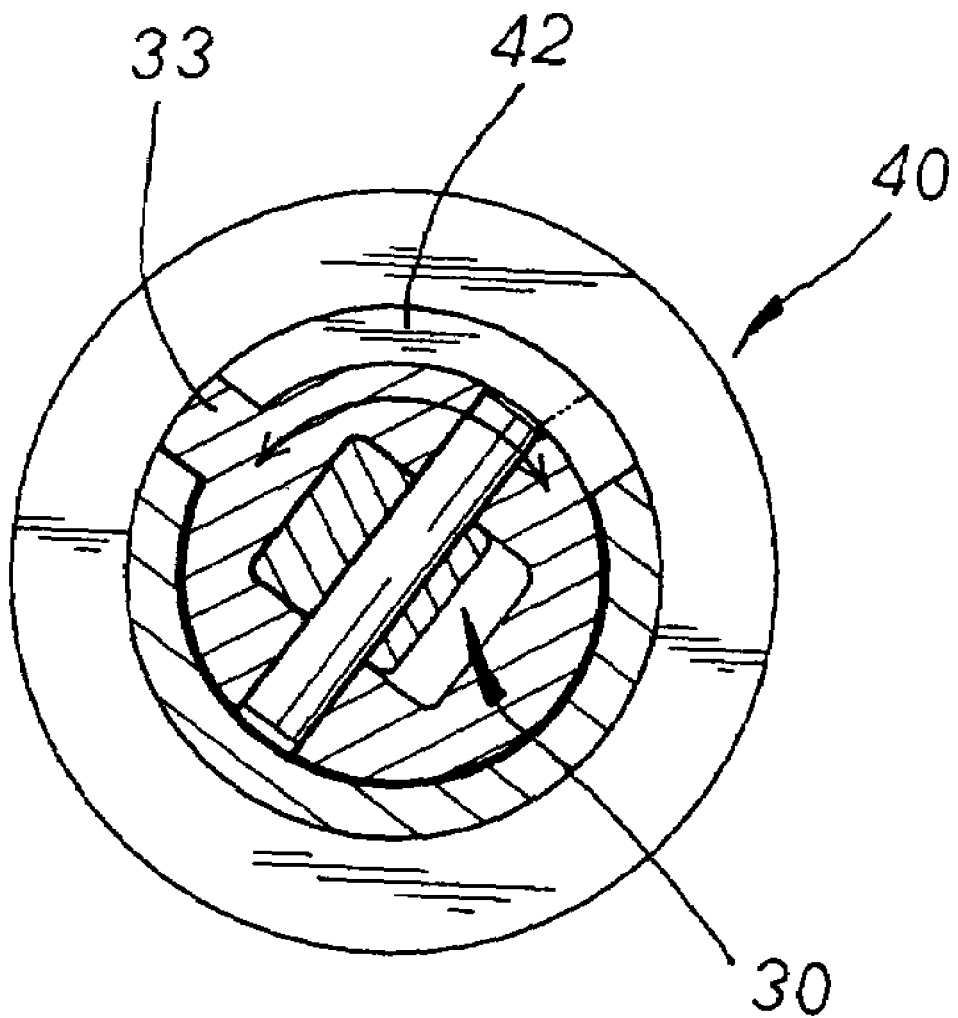
FIG. 5 is a top view of the present invention showing the left/right movement of a valve stick in regulating water temperature.

In practical use, the valve stick 30 is switched to open the valve core for water discharge. The protruded connecting section 31 of the valve stick 30 is closely abutted against the inner side of the receiving hole 52 of the switching control valve 50, activating the upper switch valve 61 joined at the bottom of the switching control valve 50 therewith so as to open the valve core for water discharge. The protruded guide spot 44 of the base mount 40 is limited to move at the indented recess 51 of the switching control valve 50 therein in the opening/closing movement of the upper switch valve 61 thereof. Besides, the base mount 40, stably located at the valve housing 22 therein, will not be moved when the valve stick 30 is rotated left/right to regulate the water temperature as shown in FIG. 5. With the protruded guide spot 44 thereof as a pivoting point, the valve stick 30 is rotated left or right with the turning protruded block 33 thereof moved at the turning cut area 42 of the base mount 40 therein, driving the switching control valve 50 and the upper switch valve 61 therewith for adjusting the water temperature. Meanwhile, the valve stick 30 along with the two-staged valve stick seat 32 thereof is refrained from being directly contacted with the valve housing 20 in operation, facilitating the easy operation of the valve stick 30 thereof even under low torque. Furthermore, the protruded guide spot 44 is limited to move at the indented recess 51 of the switching control valve 50 therein, ensuring the precise movement of the switching control valve 50 thereof when activated by the protruded connecting section 31 of the valve stick 30 so as to open the valve core for water discharge.

What is claimed is:

1. A valve core for a single handled faucet, comprising a valve housing, a valve stick, a base mount, a switching control valve, and a valve seat; the present invention being characterized by that, the valve housing, a two-staged sheltering case, having a valve chamber disposed at the interior thereof, a retaining block protruding at the inner top surface of the valve chamber thereof, and a plurality of insert grooves cut at the lower periphery thereof;

the valve stick having a protruded connecting section extending downwards at the bottom thereof, and a two-staged valve stick seat with a turning protruded block extending downwards at one upper side joined at the middle section thereof;

the base mount, a two-staged means, being equipped with a pivot hole disposed at the center thereof, a turning cut area defined at one upper side thereof, a retaining cavity cut at one lower side thereof, and a protruded guide spot disposed at the lower bottom surface thereof;

the switching control valve having an indented recess cut at one side thereof, and a receiving hole communicating with the indented recess thereof;

the valve seat being made up of an upper switch valve, and a lower switch valve with a plurality of insert parts extending upwards at the lower periphery thereof;

in assembly, the base mount, engaged with the valve stick and mounted onto the switching control valve thereof with the protruded guide spot thereof received at the indented recess of the switching control valve and the protruded connecting section of the valve stick adapted at the receiving hole of the switching control valve therein, is adapted at the valve chamber of the valve housing therein with the retaining cavity thereof engaged with the retaining block of the valve housing for secure location thereof, stably refraining from being moved or rotated by the valve stick thereof in operation;

whereby, the valve stick, pivotally switched at the base mount therein, will activate the switching control valve via the protruded connecting section and drive the upper switch valve of the valve seat joined at the bottom of the switching control valve thereof to open the valve core for water discharge; besides, with the protruded guide spot thereof as a pivoting point, the valve stick is also rotated left or right with the turning protruded block thereof moved at the turning cut area of the base mount therein to adjust the water temperature; meanwhile, the valve stick along with the two-staged valve stick seat thereof is prevented from being directly contacted with the valve housing, facilitating the easy operation of the valve stick thereof even under low torque; furthermore, the protruded guide spot of the base mount is limited to move at the indented recess of the switching control valve therein, ensuring the precise movement of the switching control valve thereof when activated by the protruded connecting section of the valve stick to open the valve core for water discharge.

* * * * *